G. J. BAUER.
ARRANGEMENT FOR PRECIPITATING DUST BY MEANS OF WATER.
APPLICATION FILED NOV. 8, 1913.
1,110,868.
Patented Sept. 15, 1914.
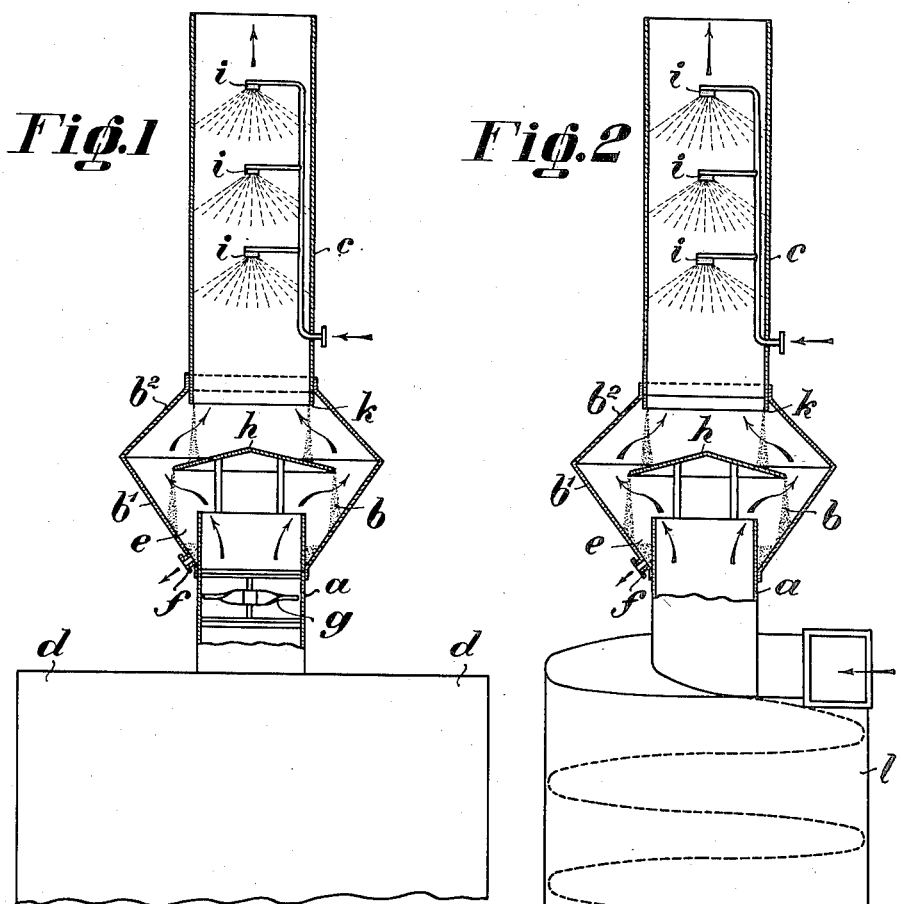
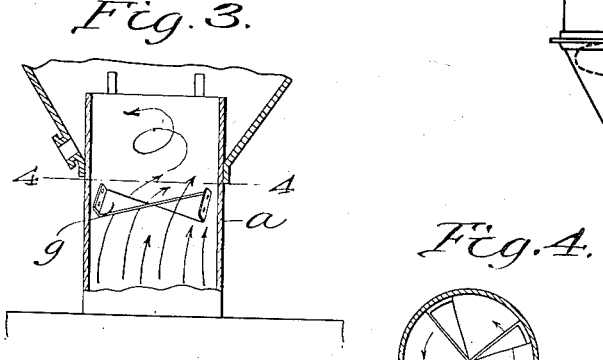
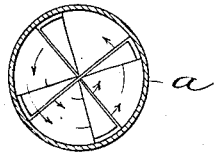
WITNESSES:
George Du Bon
John A. Kehlenbeck
INVENTOR
GEORG J. BAUER
BY
Briesen & Knauth
ATTORNEYS

UNITED STATES PATENT OFFICE.

GEORG J. BAUER, OF FRANKFORT-ON-THE-MAIN, GERMANY, ASSIGNOR TO SIMON BÜHLER & BAUMANN, INC., OF NEW YORK, N. Y., A CORPORATION OF NEW YORK.

ARRANGEMENT FOR PRECIPITATING DUST BY MEANS OF WATER.

1,110,868.   Specification of Letters Patent.   Patented Sept. 15, 1914.

Application filed November 8, 1913. Serial No. 799,947.

*To all whom it may concern:*

Be it known that I, GEORG J. BAUER, a subject of the King of Prussia, and resident of Frankfort-on-the-Main, Germany, have invented certain new and useful Improvements in Arrangements for Precipitating Dust by Means of Water, of which the following is a specification.

The present invention relates to arrangements for purifying the air, and particularly the ventilation air in industrial plants by means of water, which is squirted through nozzles into the path of the dust-saturated air.

According to the present invention a complete purification of the air is obtained by aid of an arrangement which imparts to the air in the entrance tube a circular movement, for instance a spiral fitted into said dust entrance tube, or a centrifugal dust separator arranged immediately ahead of the dust entrance tube, and by a purifying chamber, having the form of a double cone being provided behind the dust entrance tube, in which the velocity of the circulating air is reduced and by a squirting dish arranged in the middle, the air is forced to pass through a double screen of water, which is formed, on the one hand, by the water dripping down from the inside of the exhaust tube and caught up by the squirting dish, on the other hand by the water running off from the squirting dish.

The individual features of this combination are known by themselves.

The novel feature of the present invention is the peculiar combination with the result that the air is brought in contact with the water along as long a portion of its travel as possible.

In the accompanying drawing two constructional forms of the present invention are exemplified in a longitudinal section.

Figure 1 is a constructional form of the arrangement in combination with a dust collecting chamber. Fig. 2 is a constructional form of the arrangement in combination with a centrifugal dust separator. Fig. 3 is an enlarged detail section of the spiral and one method of supporting same in position and Fig. 4 is a horizontal section thereof on the line 4—4 of Fig. 3.

The arrangement essentially consists of three parts: the entrance tube $a$, a purification chamber $b$ having the shape of a double cone, and the exhaust tube $c$. The entrance tube $a$ is connected to the dust collecting chamber $d$ and enters so far into the lower cone $b^1$ of the purification chamber, that a mud space $e$ is formed for the dust bound by the water. This mud space can be emptied through the connection tube $f$. In the entrance tube $a$ is arranged a spiral $g$, which imparts a circular movement to the air saturated with dust entering into it. In the middle of the chamber $b$ is arranged a conical dish $h$, which serves as splash dish for the water to bind the dust. The water is supplied through three nozzles $i$ arranged above each other, which are arranged in the outlet tube $c$ coaxially with the tube and squirt the water chiefly against the inside wall of the tube. For preventing the water, running down these walls, from running along the inside of the upper cone $b^2$ the tube $c$ enters the cone $b^2$ so far that a dripping edge is formed at $k$.

The action of the arrangement is as follows: The air enters from the dust chamber $d$ into the entrance tube $a$ and there receives by the spiral $g$ a circulating movement. The air retains this movement also during its further travel through the purification chamber $b$ around the dish $h$ into the exhaust tube $c$.

The water supplied through the diffuser nozzle $i$ runs down to the greater part along the inside wall of the tube $c$ and drops from the dripping edge $k$ in form of a screen of water onto the splash dish $h$. Thence it runs into the mud space $e$, thereby forming a second screen of water. The air is thus obliged to pass through two screens of water in the purification chamber $b$, before it reaches the exhaust tube $c$. As the air, owing to its circulating motion and the reduction of its velocity in the chamber $b$ is exposed to the action of the water for a long time, the dust in the air is almost completely precipitated. Any particles of dust, which may be still contained in the air are bound by the water running down the wall of the tube $c$, as the air will flow along this wall in consequence of its circulating movement. The air emerging from the tube $c$ is then completely purified. The water mixed with the dust is let off from the mud space through the outlet connection provided.

In place of the spiral $g$ in the entrance tube $a$ a centrifugal dust separator of the usual cyclone type may be employed. Such an arrangement is shown in Fig. 2 of the accompanying drawing. In this dust separator $l$ the air is already purified in known manner by the centrifugal action, the heavy particles of dust being separated. The dry dust collects in the hopper of the centrifugal dust separator and is thence removed. The air assumes in this centrifugal separator a circulating movement and retains such movement during its travel through the tube $a$, the chamber $b$ and the tube $c$. During this travel the finer particles of dust are then precipitated in the aforedescribed manner.

With the arrangement described the water need have a small overpressure only of a few millimeters to obtain a complete purification of the air of all particles of dust.

I claim:

1. A device of the character described comprising an inlet tube forming a passage for dust laden air, means for imparting a rotary movement to said air in its passage through said tube, an exhaust tube, a double cone shaped purification chamber connected with said inlet and exhaust tubes whereby the velocity of the rotating air is reduced, a splash dish in said purification chamber and nozzles in said exhaust tube whereby water is squirted into the path of the air and a screen of water is formed in said purification chamber about the end of the exhaust tube and a second screen of water is formed about the periphery of said splash dish, the latter causing the rotating air to pass first through said second screen and then through said first screen into said exhaust tube.

2. The combination of an inlet tube forming a passage for dust laden air, means for imparting a rotary movement to said air, a purification chamber connected with said inlet tube and adapted to reduce the velocity of the air, an exhaust tube connected with said chamber and means for forming a plurality of screens of water in said purification chamber through which said rotating air successively passes in its passage to said exhaust tube.

In testimony whereof, I have hereunto set my hand in the presence of two subscribing witnesses.

GEORG J. BAUER.

Witnesses:
 JOHN A. KEHLENBECK,
 M. H. LOCKWOOD.